United States Patent Office 3,492,340
Patented Jan. 27, 1970

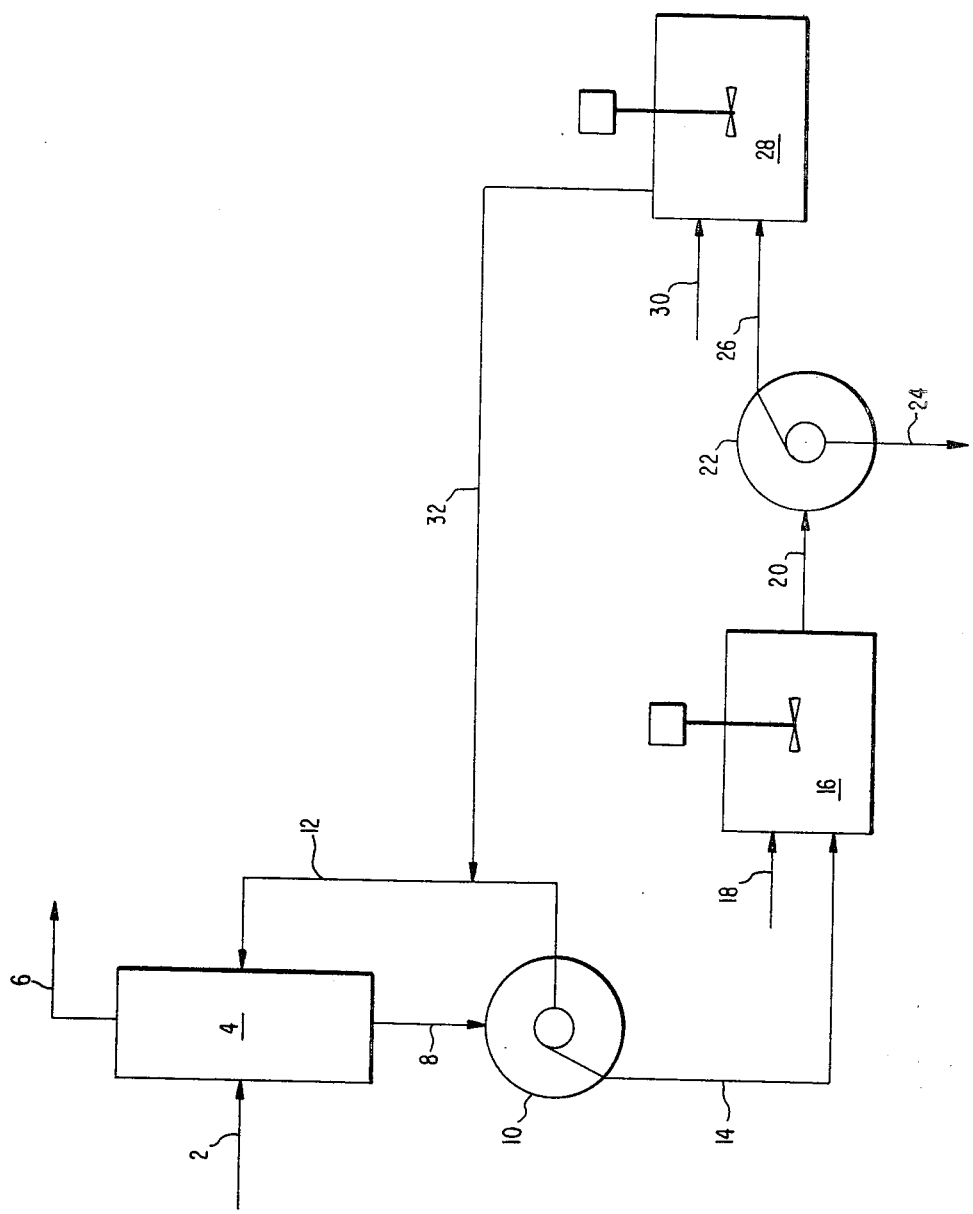

3,492,340
PREPARATION OF VINYL ACETATE AND REGENERATION OF CUPRIC ACID SALT CATALYST
Adolfo Aguilo and Edward Norwood Wheeler, Corpus Christi, Tex., assignors to Celanese Corporation, a corporation of Delaware
Filed May 2, 1966, Ser. No. 546,962
Int. Cl. C07c 67/04; B01j 11/02
U.S. Cl. 260—497          10 Claims

ABSTRACT OF THE DISCLOSURE

In processes for oxidizing an olefin, e.g. ethylene, to a derivative, e.g. vinyl acetate or ethylene glycol esters, by a process which comprises reacting the olefin with oxygen in the presence of a reaction solution containing a noble metal and a cupric redox system, copper oxalate is commonly formed from the copper and progressive deactivation of the catalyst results. The instant invention comprises a method for regenerating such copper oxalate by removing it from the reaction solution, reacting it with sodium hydroxide to convert at least a portion to cupric oxide, and then reacting the cupric oxide with an acid selected from the group consisting of hydrochloric acid and acetic acid to regenerate the copper in a soluble and catalytically active form.

---

The present invention relates to a process for the regeneration of copper catalyst. More particularly, the invention relates to a process for regenerating cupric chloride and cupric acetate catalyst, which are used in the conversion of alkenes, such as ethylene to carbonyl and ester compounds.

Heretofore, one of the primary methods for producing vinyl acetate was from acetylene. Recently, however, an ethylene-based process has been developed, which comprises reacting ethylene with acetic acid in the presence of a reduction-oxidation catalyst system, commonly referred to as a redox catalytic system. In the redox system, an acid salt of a noble metal of Group VII of the Periodic Table, for example, palladium chloride or palladium acetate, and a redox couple, such as cupric chloride or cupric acetate, are used. The palladium acid salt is reduced to palladium metal during the primary reaction step of combining ethylene with acetate to form vinyl acetate. Palladium metal is then reoxidized to the acid salt by reaction with the redox couple, such as cupric chloride, which is in turn reoxidized by reaction with oxygen. Such an ethylene-based vinyl acetate process is disclosed in U.S. patent application, Ser. No. 389,477, filed Aug. 13, 1964, by Adolfo F. Aguilo, which is assigned to the Celanese Corporation of America.

The above redox catalytic system has also been used for the conversion of alkenes, such as ethylene, to carboxylic acids and carbonyl compounds, i.e., aldehydes and ketones.

During the production of the vinyl acetate a portion of the oxygen reacts with the ethylene to form by-product oxalic acid which in turn reacts with the copper to form copper or cupric oxalate. Cupric oxalate is insoluble in the reaction solution of acetic acid, which is used in the ethylene-based vinyl acetate process, and in the aqueous reaction solution, which is used in the carboxylic acid and carbonyl production processes. Hence, the formation of the cupric oxalate precipitate removes the valuable copper from its active role in the reaction and substantially reduces the formation of the desired products.

Accordingly, the primary object of the present invention is to provide a process for regenerating or recovering cupric acid salt catalysts, that is, cupric chloride and cupric acetate, which have been converted to cupric oxalate.

In accordance with the present invention, a process is provided for regenerating a cupric acid salt catalyst which is used in the conversion of alkenes to carboxylic acid, carbonyl, and ester compounds and wherein said catalyst is deactivated by being converted to cupric oxalate. The cupric oxalate is contacted with sodium hydroxide to convert at least a portion of the cupric oxalate to cupric oxide which is thereafter contacted with an acid selected from the group consisting of hydrochloric acid and acetic acid to convert at least a portion of the cupric oxide to the cupric acid salt catalyst, which may then be reused in the alkene conversion reaction. The term "cupric acid salt catalyst," as hereinafter used, includes cupric acetate and cupric chloride.

For a better and more complete understanding of the present invention, its objects, and advantages, reference should be had to the following description and to the accompanying drawing, which is a schematic flow diagram illustrating a process for regenerating cupric acid salt catalyst used in an ethylene-based vinyl acetate process.

Ethylene, oxygen, hydrochloric acid, and acetic acid are introduced via a conduit 2 into a vinyl acetate reaction zone 4. The ethylene and acetic acid are reacted in the reaction zone 4 in the presence of a redox catalytic system comprising an acid salt of a noble metal of Group VIII of the Periodic Table, preferably palladium chloride, and a cupric acid salt catalyst as the redox couple. The cupric acid salt catalyst may be either cupric chloride or cupric acetate, which are both soluble in the acetic acid reaction system. Such a vinyl acetate reaction is normally conducted at a temperature in the range of about 75 to 130° C. and at a pressure in the range of from about 1 to 16 atmospheres, as is more fully discussed in the aforementioned copending application by Adolfo F. Aguilo, Ser. No. 389,477.

During the vinyl acetate reaction a portion of the ethylene is oxidized to form oxalic acid. The oxalic acid reacts with the cupric acetate or chloride to form cupric oxalate, which is insoluble in the reaction system. It has been found that when as little as 0.5 weight percent of oxalic acid forms, based on the weight of the reaction mixture, cupric oxalate forms and accordingly precipitates out of the reaction. In order to maintain the high rate of vinyl acetate production, the precipitated cupric oxalate must be removed from the system and regenerated.

It has also been found that when an acid salt of palladium, i.e., palladium chloride or acetate, is used in the redox system, a portion of the elemental palladium, which is formed as a result of the reduction reaction, is not reoxidized to the acid salt. Elemental palladium is insoluble in both acetic acid and aqueous reaction systems; therefore, the palladium metal which is not reoxidized precipitates out of the reaction and is removed from the system along with the precipitated cupric oxalate.

A vinyl acetate effluent is withdrawn from the reaction zone 4 via a conduit 6 and is subsequently purified to recover the desired vinyl acetate product. A slurry of the precipitated cupric oxalate and precipitated elemental palladium, if any, in a portion of the reaction solution is withdrawn from the bottom of the reaction zone 4 via a conduit 8, and conveyed to a conventional type separation zone 10, such as a filtration zone, sedimentation zone, or centrifugation zone. The precipitates are separated from the vinyl acetate reaction solution in the separation zone 10, preferably a filtration zone. The reaction solution is separately recovered and returned to the reaction zone 4 via a conduit 12.

After removing the filtrate reaction solution, the precipitates are desirably washed with water (not shown in the drawing), for example, at room temperature, to remove any occluded reaction solution. The washed precipitates are then introduced via a conduit 14 into any conventional type mixing or contacting zone 16, wherein the cupric oxalate is contacted with sodium hydroxide introduced via a conduit 18. Preferably, the mixing zone 16 is an in-line blender or jet-mixer. The cupric oxalate reacts with the sodium hydroxide to form solid cupric oxide and an aqueous solution of sodium oxalate according to the following reaction "A":

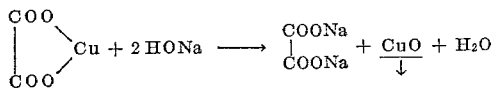

The cupric oxalate and sodium hydroxide are normally reacted at a temperature in the range of about 60 to 120° C., and preferably from about 80 to 100° C., for example, 80° C. Normally, a residence time in the range of from about 3 to 10 minutes, and preferably from about 4 to 6 minutes, for example, 5 minutes, will be sufficient to convert substantially all of the cupric oxalate to the cupric oxide. Conveniently, the reaction is conducted at atmospheric pressures, however, higher pressures may be used if so desired.

An aqueous solution of sodium hydroxide containing in the range of from about 0.5 to 10 weight percent sodium hydroxide, and preferably from about 1 to 5 weight percent, for example, 3 weight percent, may be used. Generally, more than the stoichiometric amount of sodium hydroxide required to react with the cupric oxalate is introduced via the conduit 18, for example, an excess in the range of from about 20 to 50 weight percent, for example, 30 weight percent, may be used.

Substantially none of the elemental palladium, if present, will react with the sodium hydroxide under the above mentioned conditions. Hence, cupric oxide, sodium oxalate, and substantially all of the palladium metal that may have precipitated with the cupric oxalate are withdrawn from the zone 16 via a conduit 20 and introduced into a separation zone 22, preferably a filtration zone, to separate the aqueous solution of sodium oxalate from the cupric oxide and palladium metal, the solution being discarded via a conduit 24. The solids are then preferably washed with water (not shown in the drawing), for example, at room temperature, to remove any excess sodium oxalate therefrom.

The washed solids or precipitates are recovered and conveyed via a conduit 26 into a second contacting zone 28, wherein they are contacted with hydrochloric acid or acetic acid, introduced via a conduit 30.

The cupric oxide reacts with acetic acid or hydrochloric acid according to the following reactions "B" and "C":

$$CuO + 2HOAc \rightarrow Cu(OAc)_2 + H_2O$$

$$CuO + 2HCl \rightarrow CuCl_2 + H_2O$$

to form cupric acetate and cupric chloride, respectively, which are soluble in the aqueous solution. At least a portion and preferably all of the elemental palladium which may be present will in turn react according to the following reactions "D" and "E":

$$Pd^\circ + 2CuCl_2 \rightarrow PdCl_2 + 2CuCl$$

$$Pd^\circ + 2Cu(OAc)_2 \rightarrow Pd(OAc)_2 + 2CuOAc$$

to form palladium chloride and palladium acetate, respectively, which are soluble in the aqueous solution. The resulting cuprous acid salts react with additional acetic or hydrochloric acid to yield the desired cupric acid salt. The soluble palladium and cupric acid salt catalysts in the aqueous solution are withdrawn from the zone 28 via a conduit 32 and reintroduced into the vinyl acetate reaction zone 4, via conduits 32 and 12.

The cupric oxide is reacted with the acid in the mixing zone 28 at a temperature in the range of from about 60 to 120° C., and preferably from about 70 to 90° C., for example, 80° C. Normally, atmospheric pressures are used in the zone 28, however, if desired, higher pressures may be employed. A residence time in the range of from about 3 to 10 minutes, and preferably 4 to 6 minutes, for example, 5 minutes, is conveniently used.

Preferably, an excess of acid in the range of from about 3 to 10 weight percent over the stoichiometric amount required to react with the cupric oxide, for example, 5 weight percent, is used. The hydrochloric and acetic acid are normally employed as an aqueous solution having a concentration in the range of from about 0.5 to 10 weight percent, and preferably from about 2 to 4 weight percent, for example, 3 weight percent.

As a result of the regeneration reactions, about 95 to 98 percent of the copper removed from the reaction zone 4 as cupric oxalate and about 99 percent of any elemental palladium that may have been removed are regenerated and reintroduced into the zone 4 as the cupric and palladium acid salt catalysts.

While the above regeneration process has been described with relation to the production of vinyl acetate from ethylene, it is to be understood that the process may be applied to any process for the conversion of alkenes to carboxylic acids, carbonyl, and ester compounds employing a cupric acid salt catalyst which forms a cupric oxalate precipitate during the reaction.

The principle, preferred embodiment, and mode of operation of the present invention have been described in the foregoing specification. However, it should be understood that the invention which is intended to be protected herein, may be practiced otherwise than as described without departing from the scope of the appended claims.

We claim:

1. A process for regenerating a cupric acid salt catalyst used in the conversion of alkenes to carboxylic acids, carbonyl, and ester compounds, whereby said cupric catalyst forms cupric oxalate, which process comprises contacting said cupric oxalate at a temperature between about 60° C. and about 120° C. with aqueous sodium hydroxide to convert at least a portion of said cupric oxalate to cupric oxide, and contacting said cupric oxide with an acid selected from the group consisting of hydrochloric acid and acetic acid to convert at least a portion of said cupric oxide to said cupric acid salt catalyst.

2. A process for regenerating a cupric acid salt catalyst used in the production of vinyl acetate from ethylene, whereby said cupric catalyst forms cupric oxalate, which comprises contacting said cupric oxalate with aqueous sodium hydroxide at a temperature between about 60°C. and about 120° C. to convert substantially all of said cupric oxalate to cupric oxide, and contacting said cupric oxide with an acid selected from the group consisting of hydrochloric acid and acetic acid to convert substantially all of said cupric oxide to said cupric acid salt catalyst.

3. The process of claim 2 wherein the cupric oxalate is contacted with an aqueous solution of sodium hydroxide at a temperature in the range of from about 60 to 120° C., for a period of time in the range of from about 3 to 10 minutes, and the cupric oxide is contacted with the acid at a temperature in the range of from about 60 to 120° C., for a period of time in the range of from about 3 to 10 minutes.

4. The process of claim 2 wherein an aqueous solution of sodium hydroxide having a concentration in the range of from about 0.5 to 10 weight percent is contacted with cupric oxalate at a temperature in the range of from about 80 to 100° C. for a period of time in the range of from about 4 to 6 minutes.

5. The process of claim 4 wherein in the range of from about 20 to 50 weight percent in excess of the stoichiometric amount of sodium hydroxide required to react with the cupric oxalate is used.

6. The process of claim 2 wherein an aqueous solution of the acid having a concentration in the range of from about 0.5 to 10 weight percent is contacted with the cupric oxide at a temperature in the range of from about 70 to 90° C. for a period of time in the range of from about 4 to 6 minutes.

7. The process of claim 6 wherein from about 3 to 10 weight percent over the stoichiometric amount of acid required to react with the cupric oxide is used.

8. In a process for producing vinyl acetate in a reaction zone wherein vinyl acetate is formed by reacting ethylene with acetic acid in the presence of oxygen and a redox catalytic system comprising a noble metal of Group VIII of the Periodic Table and a cupric acid salt catalyst as the redox couple, and whereby at least a portion of the cupric acid salt catalyst is converted to cupric oxalate, the improvement which comprises
   (a) withdrawing a slurry of precipitated cupric oxalate in a portion of the reaction solution from the vinyl acetate reaction zone,
   (b) separating the withdrawn cupric oxalate from the reaction solution,
   (c) contacting the separated cupric oxalate with aqueous sodium hydroxide at a temperature between about 60° C. and about 120° C. to convert at least a portion of said cupric oxalate to cupric oxide,
   (d) contacting said cupric oxide with an acid selected from the group consisting of hydrochloric acid and acetic acid to convert at least a portion of the cupric oxide to cupric acid salt catalyst, and
   (e) thereafter reintroducing the regenerated cupric acid salt catalyst into said vinyl acetate reaction zone.

9. The process of claim 8 wherein substantially all of said cupric oxalate is converted to cupric oxide by contacting said cupric oxalate with an aqueous solution of sodium hydroxide having a concentration in the range of from about 0.5 to 10 weight percent at a temperature in the range of from about 80 to 100° C. for a period of time in the range of from about 4 to 6 minutes and wherein substantially all of said cupric oxide is converted to cupric acid salt catalyst by contacting said cupric oxide with an aqueous solution of the acid having a concentration in the range of from about 0.5 to 10 weight percent at a temperature in the range of from about 70 to 90° C. for a period of time in the range of from about 4 to 6 minutes.

10. In a process for producing vinyl acetate in a reaction zone wherein vinyl acetate is formed by reacting ethylene with acetic acid in the presence of oxygen and a redox catalytic system comprising a palladium acid salt and a cupric acid salt, and whereby at least a portion of the cupric acid salt is converted to cupric oxalate, and whereby the palladium acid salt is converted to elemental palladium, a portion of which precipitates, the improvement which comprises
   (a) withdrawing a slurry of precipitated cupric oxalate and elemental palladium in a portion of the reaction solution from the vinyl acetate reaction zone,
   (b) separating the withdrawn cupric oxalate and elemental palladium from the reaction solution,
   (c) contacting the separated cupric oxalate and elemental palladium with aqueous sodium hydroxide at a temperature between about 60° C. and 120° C. to convert at least a portion of said cupric oxalate to cupric oxide,
   (d) contacting said cupric oxide and said separated elemental palladium with an acid selected from the group consisting of hydrochloric acid and acetic acid to convert at least a portion of the cupric oxide to cupric acid salt, whereby at least a portion of the elemental palladium is converted to palladium acid salt, and
   (e) thereafter reintroducing the regenerated cupric acid salt and palladium acid salt into said vinyl acetate reaction zone.

References Cited

UNITED STATES PATENTS

| 3,154,586 | 10/1964 | Bänder et al. | 260—597 |
| 3,221,045 | 11/1965 | McKeon et al. | 260—497 |
| 3,346,626 | 10/1967 | Schaffer et al. | 260—497 |

OTHER REFERENCES

Remy, Treatise on Inorganic Chem. II, 1956, pp. 384–385.
Jones, Inorganic Chem., 1947, pp. 718–719.
Partington, Inorganic Chem., 1950, pp. 728–729.
Sneed et. al., Comprehensive Inorganic Chem., 1954, pp. 68–69.

LORRAINE A. WEINBERGER, Primary Examiner

V. GARNER, Assistant Examiner

U.S. Cl. X.R.

252—413; 260—533, 597, 604